United States Patent [19]

Lee

[11] Patent Number: 4,893,025
[45] Date of Patent: Jan. 9, 1990

[54] DISTRIBUTED PROXIMITY SENSOR SYSTEM HAVING EMBEDDED LIGHT EMITTERS AND DETECTORS

[76] Inventor: Sukhan Lee, 4913 Revlon Dr., La Canada, Calif. 91011

[21] Appl. No.: 292,047

[22] Filed: Dec. 30, 1988

[51] Int. Cl.⁴ ........................................... G01N 21/86
[52] U.S. Cl. ..................................... 250/561; 356/1; 901/47; 250/578
[58] Field of Search ..................... 250/221, 222.1, 560, 250/561, 578; 356/1, 3, 4; 901/46, 47

[56] References Cited

U.S. PATENT DOCUMENTS

| | | | |
|---|---|---|---|
| 3,206,605 | 9/1965 | Johns | 356/1 |
| 3,327,584 | 6/1967 | Kissinger | 88/14 |
| 4,171,160 | 10/1979 | Ernst | 356/375 |
| 4,410,804 | 10/1983 | Stauffer | 902/47 |
| 4,576,481 | 3/1986 | Hansen | 356/375 |
| 4,582,424 | 4/1986 | Kawabata | 356/1 |
| 4,585,948 | 4/1986 | Schneider et al. | 250/278 |
| 4,695,156 | 9/1987 | Taft | 901/47 |
| 4,766,322 | 8/1988 | Hashimoto | 901/47 |
| 4,808,064 | 2/1989 | Bartholet | 901/47 |

OTHER PUBLICATIONS

Lippmann, Richard P., "An Intorduction to Computing with Neural Nets," IEEE ASSP Magazine, pp. 4–22, Apr. 1987.

Primary Examiner—David C. Nelms
Assistant Examiner—Stephone B. Allen

[57] ABSTRACT

A distributed proximity sensor system is provided with multiple photosensitive devices and light emitters embedded on the surface of a robot hand or other moving member in a geometric pattern. By distributing sensors and emitters capable of detecting distances and angles to points on the surface of an object from known points in the geometric pattern, information is obtained for achieving noncontacting shape and distance perception, i.e., for automatic determination of the object's shape, direction and distance, as well as the orientation of the object relative to the robot hand or other moving member.

8 Claims, 5 Drawing Sheets

DISTRIBUTED PROXIMITY SENSOR SYSTEM HAVING EMBEDDED LIGHT EMITTERS AND DETECTORS

ORIGIN OF THE INVENTION

The invention described herein was made in the performance of work under a NASA contract, and is subject to the provisions of Public Law 96-517 (35 USC 202) in which the Contractor has elected not to retain title.

TECHNICAL FIELD

The invention relates to a sensor for automated equipment, and particularly to a distributed proximity sensor system for the hand of a robot, or other mechanical member of automation equipment.

BACKGROUND ART

Many of the complex tasks to be performed by robots, or robot-like equipments in assembly operations, require a delicate interaction between a hand, or other moving member, and an object, often in a poorly structured environment. For such tasks, the identification of precise functions to be carried out by a robot is often extremely difficult to anticipate and program. This creates the necessity of having a robot capable of automatically carrying out local tasks involving self-adaptation to environmental conditions and uncertainties, i.e., creates the necessity of robot local autonomy.

It is believed that a "smart hand" integrated with various sensors can play a major role in accomplishing robot local autonomy. Their possible roles include the automatic scanning, centering, approaching, collision detection and avoidance, tracking, grasping, compliance and force control, and even local manipulation of an object. To accomplish these roles, a "smart hand" must depend heavily on the capability of accurately sensing local informations. Such sensing involves an active search to collect information necessary to, e.g., identify the global shape of an object, which often plays a significant role in simply recognizing the object.

STATEMENT OF THE INVENTION

Accordingly, it is an object of the invention to provide a distributed sensor system comprised of multiple proximity sensors embedded on the surface of a robot hand, or other moving member. By distributing proximity sensors capable of detecting distances and angles to points on the surface of an object, information is obtained for achieving noncontacting shape and distance perception, i.e., for automatic determination of the object's shape, direction and distance, as well as the orientation of the object relative to the robot hand or other moving member.

The surface on which the proximity sensors of the system are embedded may take any defined shape, the simplest of which is a planar shape. Each proximity sensor consists of a defined pattern of interspersed light emitters and receivers, such as thirteen receivers distributed on two concentric circles, six on an outer circle at points defining a hexagon, and six on an inner circle at points defining a smaller hexagon centered on the outer hexagon, but with its points rotated 30° from the points of the outer hexagon, and a thirteenth receiver at the center of the two concentric hexagons such that the centered receiver is spaced to form equilateral triangles with each two adjacent receivers on the inner hexagon, and each of the receivers on the outer hexagon forms an equilateral triangle with two adjacent receivers on the inner hexagon. The light emitters, twelve in number, are dispersed with one in the center of each group of three receivers that define an equilateral triangle.

Each light emitter consists of a light emitting diode and an optical guide to form a light beam with its axis tilted slightly toward the center of an adjacent receiver that is either closer or further from the center of the array, and a dispersion angle of the beam sufficient to span an aperture of the light receiver toward which it is tilted. Thus, the twelve light emitters are dispersed on two circles, six on an outer circle, alternately tilted in and out with respect to the center of the array, and six on an inner circle alternately tilted in and out in a similar manner, and positioned on the same radial line as emitters on the outer circle, but tilted in the opposite direction from the emitters on the outer circle so that they alternately tilt toward and away from each other in six radial line positions spaced at 60° intervals.

Each light receiver is comprised of a geometrically defined nonplanar surface, such as the inside of a hemispherical or cylindrical surface, and is embedded in the robot hand, or other moving member that is to have a proximity sensing capability, and an array of light-sensitive devices, such as phototransistors, which are uniformly spaced on the geometrically defined nonplanar surface. A lens over an aperture through which reflected light is received provides a pinhole camera effect in focusing light into the receiver. The position of a device in the receiver which receives the most reflected light depends upon the incidence angle of the reflected light at the aperture, which in turn depends upon the distance and orientation of an object reflecting light from each one of the emitters turned on individually in sequence. By turning on the emitters one at a time in a known sequence, the source of the light is known at each moment of received light by any of the light-sensitive devices in each of the receivers, and the distance of the object can be determined from the equation:

$$d = \frac{\cos \theta_2}{\sin (\theta_1 + \theta_2)} X_c,$$

where $X_c$ is the distance between the light emitter turned on and axis of the light receiver, $\theta_1$ is the emitter tilt angle, and $\theta_2$ is the angle of the received light with respect to the axis of the receiver (hemispherical or cylindrical). Given that this distance measurement can be made for every receiver-emitter pair of the sensor system embedded in a hand, or other moving member of a robot or automation equipment, the sensor system provides information for achieving noncontacting perception capable of carrying out recognition of the three-dimensional shape of an object, its distance, and its relative position and orientation.

The novel features that are considered characteristic of this invention are set forth with particularity in the appended claims. The invention will best be understood from the following description when read in connection with the accompanying drawings.

DETAILED DESCRIPTION OF THE INVENTION

Figure 1:
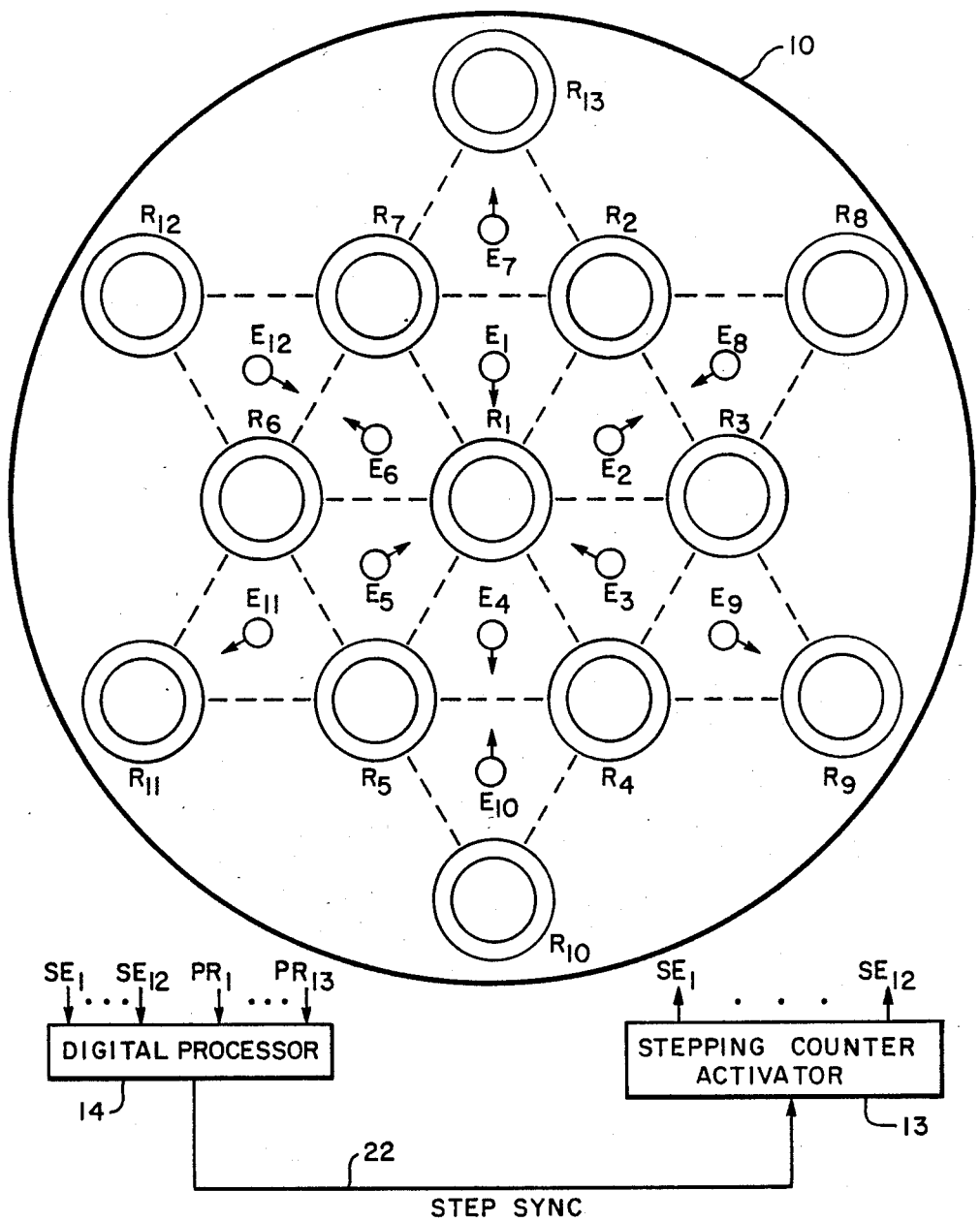
FIG. 1 illustrates schematically an array of light emitters and receivers in a distributed proximity sensor embedded in the planar surface of a robot hand or other mechanical member of automation equipment, represented by a circle enclosing the array.

Referring to FIG. 1, the basic architecture of a proximity sensor is an array of distributed light emitters $E_1$ through $E_{12}$ and receivers $R_1$ through $R_{13}$ embedded in the surface of a robot hand (palm and/or fingers), or moving member of automation equipment, as represented by a circle 10 enclosing the array. The array is preferably distributed on a planar surface to simplify the determination of distance and orientation of an object by the triangulation method illustrated in FIG. 2. However, the surface may have any known geometric shape that may be taken into account by the mathematics required for the trigonometry involved in the problem.

Each light emitter consists of a light emitting diode (LED) 11 and an optical guide 12 (or optical fiber) to form a light beam with a small dispersion angle, and a small tilt angle $\theta_1$. As an alternative to embedding a light emitting diode at each emitter position to be independently activated, light from a single light emitting diode may be distributed to the successive positions $E_1$ through $E_{12}$ using a multiplexer or distributor, such as a rotating mirror which deflects light from the single source to the positions $E_1$ through $E_6$ in sequence and then, upon tilting the mirror slightly, distributing the light to the positions $E_7$ through $E_{12}$. A stepping motor (not shown) for rotation and a tilting cam geared to the stepping motor is all that would be required to activate the light emitting positions $E_1$ through $E_{12}$ in sequence. The digital servo system for this rotation and tilting mechanism would thus provide information signals $SE_1$ through $SE_{12}$ to indicate which emitter is being activated. Otherwise, a stepping counter activator 13 will electrically energize the emitters in sequence and provide the information signals indicating which emitter is being activated at any given time.

Figure 3A:
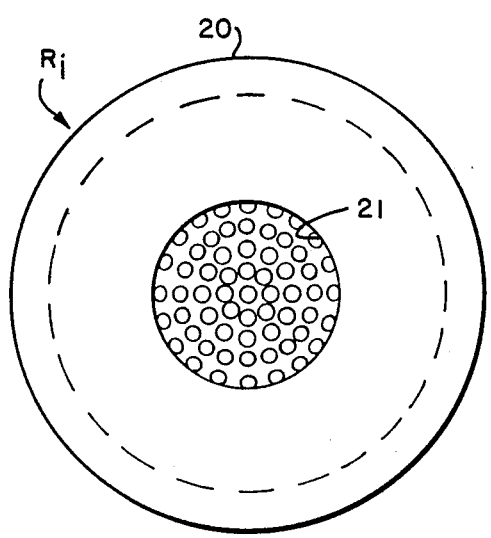
FIGS. 3a and 3b illustrate schematically a front view and a cross-sectional view of a light receiver for the system of FIG. 1.
Figure 3B:
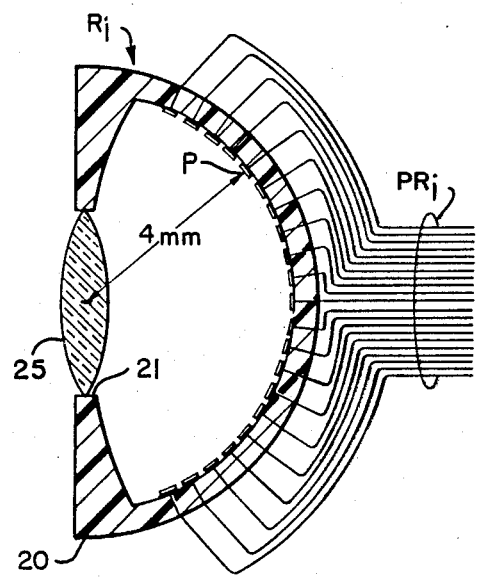

Current from the light detected by each receiver through an array of light-sensitive devices on the inside surface of a hemispherical structure shown in FIGS. 3a and 3b is coupled into a digital processor 14 through cables identified in FIG. 1 by the references $PR_1$ through $PR_{13}$, and shown in FIG. 3 for one receiver $R_i$ as a cable $PR_i$ for the receiver $R_i$. Each conductor of the cable is separately connected to a light-sensitive device of an array which is, for example, on a dedicated very large scale integrated circuit (VLIC) chip. Each VLIC chip selects and identifies the conductor having the greatest amplitude and then carries out the calculations necessary to solve for the distance to a light reflecting object from the equation:

$$d = \frac{\cos \theta_2}{\sin (\theta_1 + \theta_2)} X_c.$$

This distance information from each of the receivers is then utilized to determine not only distance to the object but also the shape of the object, and the position and orientation of the object relative to the robot hand, or member of automated equipment, in order to control it.

Figure 2:
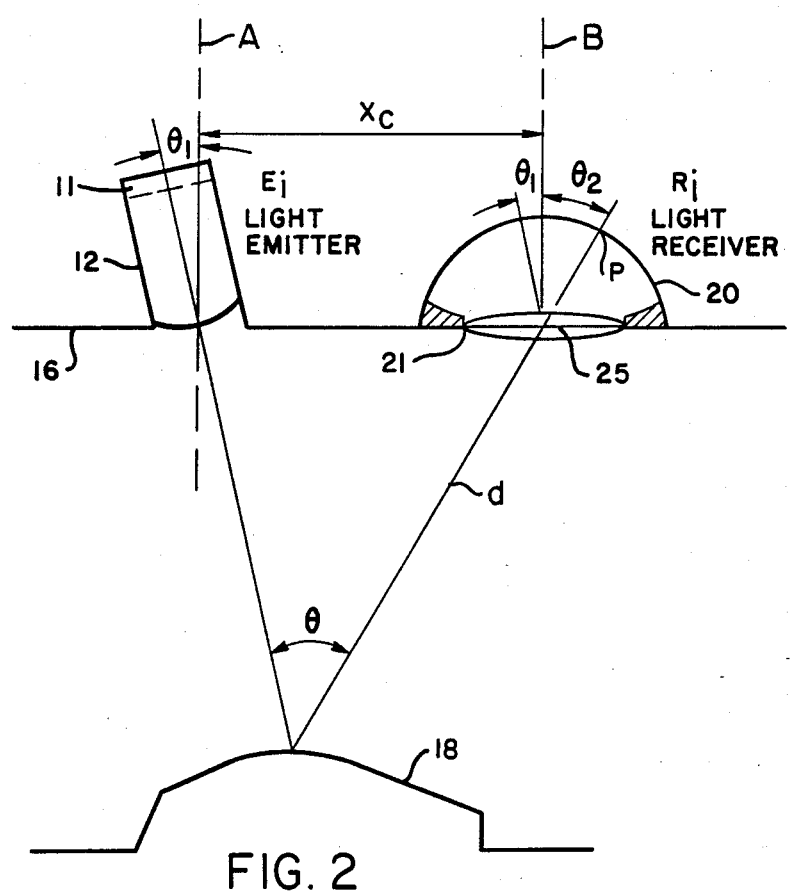
FIG. 2 illustrates schematically a diagram of a cross section taken on the line 2—2 in the schematic diagram of FIG. 1 and an object to define the problem that must be solved in order to determine the distance of a receiver from an object.

Referring to FIG. 2, the light emitting diode (LED) 11 and guide 12 (or the equivalent using an optical fiber) are oriented with a small angle $\theta_1$ with respect to an axis A normal to the planar mounting surface 16. Light reflected from an object surface 18 enters a hemispherical light receiver 20 through an aperture 21. A light sensor in the hemispherical receiver at a point P receiving the greatest intensity of light produces a signal identifying the point. A known angle $\theta_2$ from a radial line and that point P and an axis B normal to the mounting surface is thus determined. The distance d can then be readily determined by solving the above equations from the known distance $X_c$ between the emitter axis A and the receiver axis B. Note that the reflectance angle $\theta$ is equal to $\theta_1 + \theta_2$, and that the angle $\theta_1$ is the known tilt angle of the emitter. Since $\theta_2$ is the tilt angle of the light sensing device receiving the greatest intensity of light in the receiver. That angle may be stored by the digital processor in a table for the light emitter $E_1$ and receiver $R_i$ combination, and read out upon identifying the point P receiving the greatest magnitude of light at the time the light emitter $E_i$ is turned on. This is done for each of the thirteen receivers before the system steps to the next of eleven emitters. The entire sequence is continually repeated under synchronous control of the light emitters by the digital processor via a line 22.

This unique relationship between the reflectance angle $\theta$ and the tilt angle $\theta_2$ of the light sensitive device in the receiver defines the distance d. From information similarly gathered from all thirteen light receivers in the array shown in FIG. 1, the shape, direction, distance and orientation of the object can be determined, if not from one single look by all thirteen receivers, then from a succession of looks with some relative motion between each look of the proximity sensor system of FIG. 1 relative to the object between each look.

With one proximity sensor system embedded in each finger of a robot hand, and one embedded in the palm, the digital processor can develop three dimensional information about the object. The programs necessary for accomplishing all that are complex, but well within the skill of the art. The present invention does not address that, but rather just the proximity sensor system. Nevertheless a general outline of how the proximity sensor system is to be used will now be set forth.

To facilitate determining the distance d using each of the thirteen receivers $R_1$ through $R_{13}$, look-up tables may be generated for all possible values of $\theta_2$ for each light emitter $E_i$. In that manner, the digital processor 14 need only select the appropriate table for each combination of emitter and receiver, and from the position of light sensing device receiving the greatest intensity of light in the receiver, reading out the value of distance which has been precomputed from the equation above and stored. To determine which light-sensing device has the greatest intensity, a "winner-take-all" circuit may be employed which, for example, includes an output amplifier for each light sensing device and inhibiting feedback from each amplifier to all others. That will cause an increase of current at the output of the amplifier for the light sensing device receiving the most light, and a reduction of the current at the output of all other amplifiers. The regenerative effect of this feedback will continue until only one amplifier has any output current.

The function of such a winner-take-all circuit could be implemented in an alternative way, such as by adjusting a global threshold for all amplifiers until one is still producing an output. Still other circuits may be used for such a winner-take-all function. See Lippman, Richard P., "An Introduction to Computing with Neural Nets," IEEE ASSP Magazine, pp 4–22, April 1987, on the topic at page 10 of selecting or enhancing the input with a maximum value.

Yet another technique would be for the digital processor to poll every light-sensitive device in sequence, and compare the amplitude of each in succession with the highest one found thus far in the sequence and store (together with its identification number) the amplitude of the last "highest one" found, each time discarding the previous "highest one" stored. In that way, only the value of highest amplitude and its identification number survives the polling sequence of all the light-sensitive devices in the receiver. The identification number is then used to read out a table the value of the angle $\theta_2$ in order to be able to compute the distance d, and from that distance computed in the course of turning on other emitters in sequence define other desired information, such as the object, shape and orientation. Alternatively, for each angle $\theta_2$ and the distance $X_c$ between the emitter and receiver pair, the distance d may be precomputed and stored in the table instead of the value of the angle $\theta_2$.

Referring to FIGS. 3a and 3b, the structure of the receiver $R_i$ in the set of receivers $R_1$ through $R_{13}$ in FIG. 1, is comprised of a hemispherical structure as shown in FIG. 3b embedded with an array of light-sensing devices starting with one in the center and rings of light-sensing devices around the center one progressing from the one centered and progressing outward, as shown in FIG. 3a for four concentric rings about a center one that can be seen through an aperture 25. This arrangement of the aperture and sensors effectively provides latitude and longitude position data for each light sensing device down to a latitude of about 15°. In practice, a sensing device at a latitude less than about 15° will not be in a position of interest primarily because the surface of the object 18 (FIG. 2) would then be too close (very nearly touching) the surface 16 on which the array and receivers are embedded for any meaningful action to be taken. At such close range, tactil rather than optical sensors should be relied upon for further control of the robot hand or other moving member.

The inside radius of the hemispherical receiver may be typically 4 mm, for a total diameter across the space it occupies in the structure of typically 10 mm, and a total depth of about 5 mm.

A lens 25 (shown in FIG. 2 and FIG. 3b) may be placed over the aperture 25 to focus light and thus create as much of a pinhole effect as possible for an emitter image (light beam from an actuated emitter).

Roughly speaking, this hemispherical (half-dome) structure is like a miniature camera collecting the scattered light from an object surface to form an image on the inside surface embedded with light sensing devices. As the position of the actuated light emitter changes, the position of the light-sensitive device receiving the greatest amount of the reflected light from the object will change so that for each of the emitters $E_1$ through $E_{12}$ there is a different look for each of the receivers $R_1$ through $R_{13}$. This provides for much greater information to be obtained than from, for example, a simple array of pixel detecting devices in an image sensing plane such as commonly used in a CCD (charge coupled device) video camera that can produce only a 2-dimensional image without a third dimension for greater information.

This embodiment of the invention using a hemispherical structure for a light receiver, and an array comprised of thirteen light receivers and twelve light emitters, had as its objective the enhanced accuracy and extended view sight as well as miniaturizing the sensing devices in a receiver in order to mount a distributed proximity sensor on robot fingers as well as the palm of a hand. The allocation of receivers and light sources shown in FIG. 1 was made by applying heuristical rules (requirements) of minimum space for a given number of emitters and receivers, maximum input flux for increasing measurable distance and orientation, and overlap of measurable ranges. The resulting design was made with a distance measuring restriction of 1 cm to 5 cm, and an orientation restriction of −60° to +60°, with an expected error in measurement in the restricted range of about 0.01 mm to 0.02 mm per millimeter distance. Although this design meets the objective, the cost of fabricating a nonplanar integrated circuit as the best mode of producing the receivers has led to a second embodiments for the receivers.

A second embodiment of the invention using a cylindrical structure will now be described with reference to FIG. 4 which shows in cross section a hollow cylindrical structure 30 for receiving linear arrays 32 of light-sensing devices disposed on the inside of the cylindrical wall, each linear array being parallel to the axis of the cylindrical structure, and ideally so many as to completely line the wall with arrays adjacent to each other, but in practice as few as nine linear arrays are centered at 40° intervals, each filling a sector of about 20°, as may be more clearly seen in FIG. 4b, where the positions of the arrays 32 are numbered 1 through 9 clockwise. Note that a cross section shown in FIG. 4a has been taken on a line 4a—4a in FIG. 4b passing through array positions 1 and 5 to show an array centered at the top of FIG. 4b and an array centered at the bottom of FIG. 4b, when in practice it is clear from FIG. 4b there are no linear arrays of sensors diametrically opposite each other. It is believed that thus providing nine arrays, such that there are no two diametrically opposite each other, it will be easier to determine which array has a sensor receiving the greatest amount of light, although for the greatest degree of resolution, the entire surface of the cylindrical wall will ideally be covered with linear array.

Figure 4A:
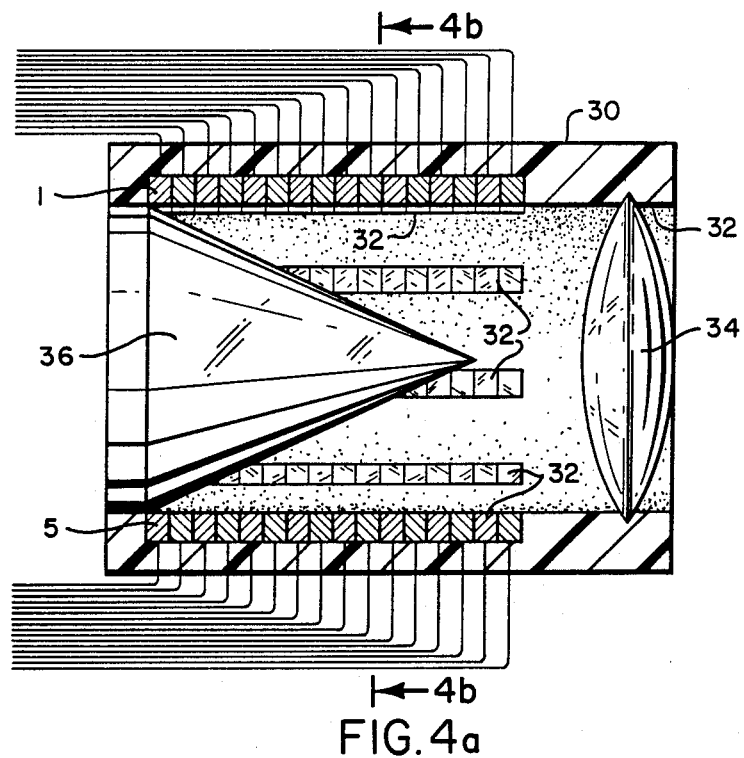
FIG. 4 illustrates schematically a longitudinal cross section of a second embodiment of a light receiver for the system of FIG. 1.
Figure 4B:
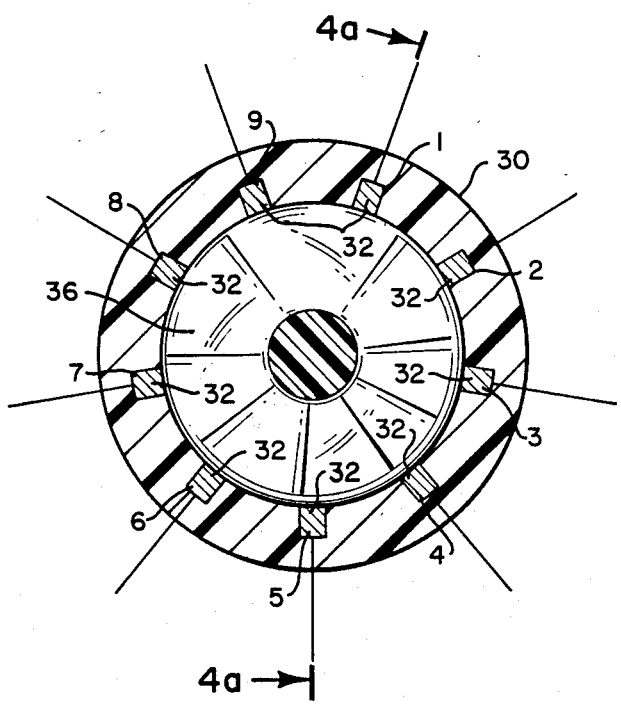
Figure 5:
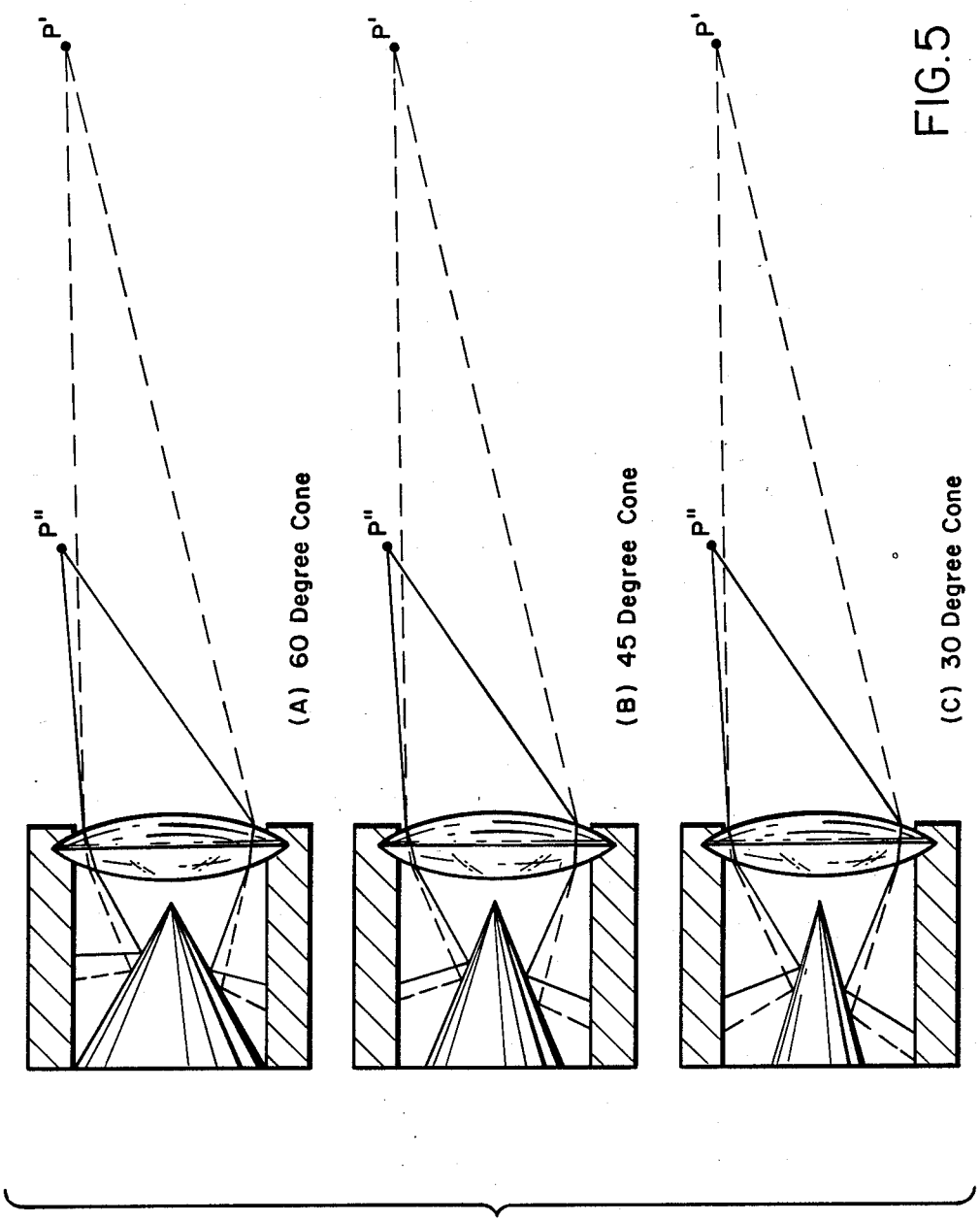
FIGS. 5a, 5b and 5c illustrate schematically the variation of image position as a function of the cone angle of a conical reflector in the embodiment of FIG. 4.

A lens 34 shown in FIG. 4a focuses the incoming light to a spot projected to be on the base of a cone-shaped reflector 36 that interrupts the reflected light from an object and directs it onto the linear arrays. As shown in FIGS. 5a, b, and c, receiver arrays which are positioned on the same side of the cone axis as light reflected from a point P' on an object will have meaningful information as do all others because other light-sensitive arrays are always illuminated. Using this characteristic, x and y coordinates of the light spot reflected from an object can be determined relative to the cone axis. For instance, if the position of the light spot from the object is on the axis, light-sensitive devices of each linear array will be illuminated to the same level from the base of the cone, that level forming a circle in the wall of the cylindrical structure. If the spot is at a position P to one side of the cone axis, the result is that the level to which light-sensitive devices are illuminated will form an ellipse, with a larger major axis as the angle by which the position P is displaced from the cone axis increases. Information thus gathered from all receivers for each emitter in sequence will thus provide sufficient distance information to determine overall distance, shape and orientation of the object.

FIGS. 5a, b and c illustrate the effect of varying the cone angle a from 60° to 30° in 15° increments. As may be appreciated, this cone angle does not significantly vary the resolution of range or distance, d. The further the point P' from the lens of the receiver, the smaller the angle of the point P' from the axis of the cone, and the less the height of illumination of the cylindrical wall by the reflected light from the conical reflector, regardless of the size of the cone angle, as may be appreciated by comparing the dotted lines from the point P' with the dash-dot lines from the point P'' in FIGS. 5a, b and c. Similarly, the greater the angle of the point P' from the axis of the cone, the greater the height of illumination of the cylindrical wall. But regardless of the angle and the distance of the point P', vector analysis of the geometry may be used to determine the distance. Once the distances from a given light emitter to different light receivers is determined, there is sufficient information to begin defining the distance, shape and orientation of the object. Similar information from different light emitters turned on in sequence will fill in complete three-dimensional information about the light reflecting object relative to the multiple proximity sensors in the distributed sensor system of FIG. 1.

Figure 6:
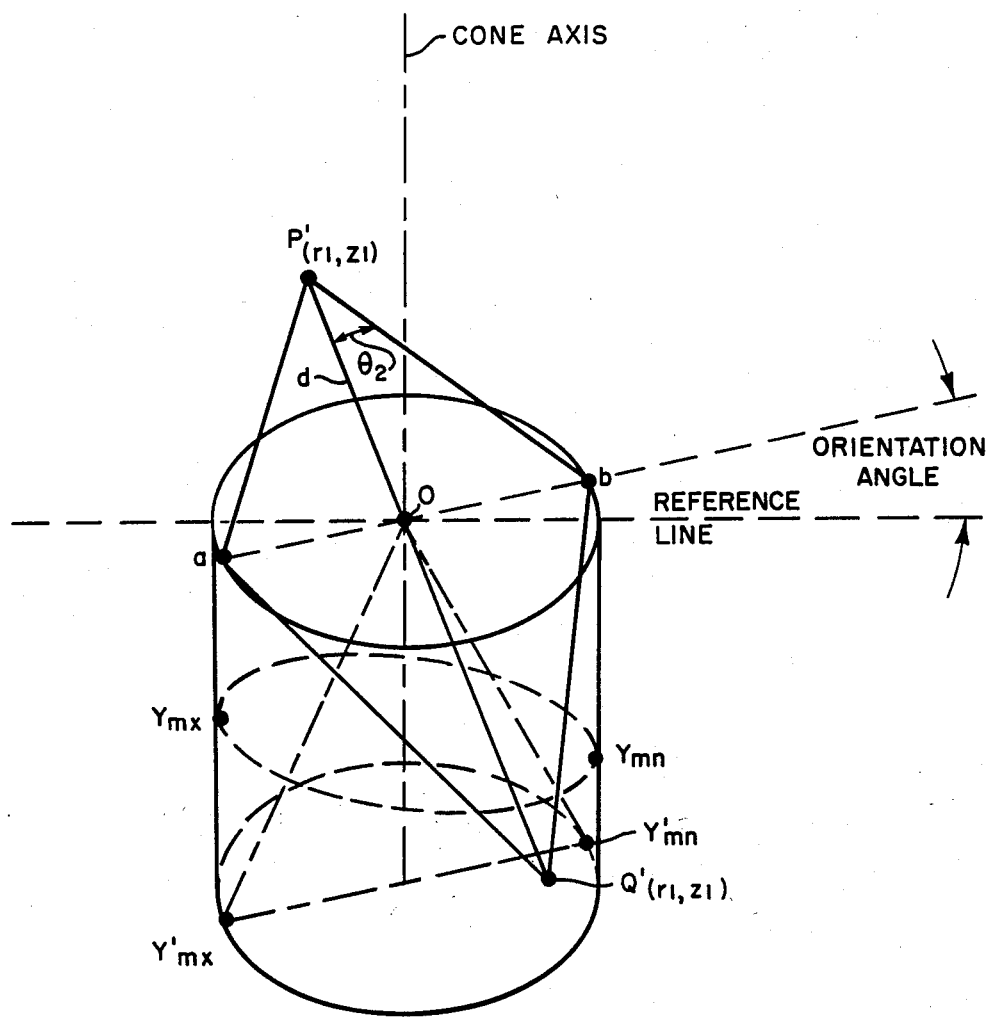
FIG. 6 illustrates schematically a cylindrical receiver and a reflection point P' on the object (not shown) to outline the general nature of the problem that must be solved in order to determine the distance of a receiver from an object.

It should be recognized from FIG. 5a, for example, that unless the point P' is on the axis, the cone of reflected light will illuminate the wall of the cylinder to a maximum height from the base of the reflecting cone on the same side of the cone axis as the point P', and to a minimum height on the diametrically opposite side. Those two points shown in FIG. 6 of the maximum height pixel, $Y_{mx}$, and the minimum height pixel, $Y_{mn}$, fix the major axis of an ellipse. Theoretically, that major axis between points $Y_{mx}$ and $Y_{mn}$, the center of the lens, 0, and the point P' are all in the same plane. The center of the lens, 0, and the points $Y_{mx}$ and $Y_{mn}$ can be readily projected onto the base of the cylinder, or the base of the cone in the preferred case of the cone having the same diameter as the cylinder illustrated in FIG. 5a. The resulting plane defined by points $Y_{mx}'$, $Y_{mn}'$, and 0 readily establish the angular orientation of the point P' from some reference line. A line through the center of the lens at that orientation angle then establishes points a and b at diametrically opposite sides of the lens. Points a, b and P' then define a plane. If a line from the point P' through the center of the lens, 0, is projected on that plane to intersect with the cylinder, a point Q' at vector coordinates $r_2 z_2$ is established. These coordinates $r_2 z_2$ bear a relationship to the vector coordinates $r_1 z_1$ of the point P' given by the following equations:

$$\frac{1}{f} = \frac{1}{r_1} + \frac{1}{r_2}$$

$$\frac{1}{f} = \frac{1}{z_2} + \frac{1}{z_2}$$

where 1/f is the known focal length of the lens. From these equations, and the known heights $Y_{mx}$ and $Y_{mn}$, vector analysis can be carried out to determine the distance d and angle $\theta_2$ of the point P' from the cone axis, which is the axis of the cylindrical receiver. However, solution of the resulting vector algebra equations necessary to compute d is rather complex. Therefore, it is preferred to make a table of distance as a function of $Y_{mx}$, $Y_{mn}$ table of off-line measurements for the cylindrical receiver when it is used in the proximity sensor array of FIG. 1. The table size required is at most $M^2$, where M is the number of pixels of one linear array of photosensors. If a small number of linear arrays are provided, such as the nine shown in FIG. 4b, and interpolation is used, each interpolated linear array position that is determined to the desired pixel resolution around the wall of the cylinder would then be included in the table as though a linear array were present in that interpolated linear array position.

Although particular embodiments of the invention have been described and illustrated herein, it is recognized that modifications and variations may readily occur to those skilled in the art. Consequently, it is intended that the claims be interpreted to cover such modifications and variations.

I claim:

1. A distributed sensor system for robotics comprised of multiple proximity sensors embedded on the surface of a robotic moving member, each proximity sensor comprising a defined pattern of interspersed light emitters and receivers, each receiver having an aperture with a lens focusing light onto an array of photosensitive devices, and each light emitter comprising a light emitting diode and an optical guide to form a light beam with its axis tilted slightly toward the center of an adjacent receiver that is either closer or further from the center of said defined pattern, and with a dispersion angle sufficient to span said aperture of one of said light receivers toward which it is tilted.

2. A distributed sensor system as defined in claim 1 wherein each light receiver is comprised of a geometrically defined nonplanar surface embedded in said moving member and an array of photosensitive devices uniformly spaced on said geometrically defined nonplanar surface with said lens over said aperture through which reflected light is received to provide a pinhole camera effect in focusing light into the receiver, whereby the position one of said devices in the receiver which receives the most reflected light depends upon the incidence angle of the reflected light at the aperture, which in turn depends upon the distance and orientation of an object reflecting light from one of said emitters.

3. A distributed sensor system as defined in claim 2 including means for turning on said light emitters one at a time in a known sequence, thereby to enable each receiver to receive light from only one emitter at a time, whereby each receiver determines the distance of an object reflecting light from one emitter of known position relative to each receiver, and the distance of the object can be determined from an equation:

$$d = \frac{\cos \theta_2}{\sin (\theta_1 + \theta_2)} X_c,$$

where $X_c$ is the distance between the light emitter turned on and an axis of the light receiver, $\theta_1$ is the emitter tilt angle, and $\theta_2$ is the angle of the received light with respect to the axis of the receiver, whereby said sensor system provides information for achieving noncontacting perception capable of carrying out recognition of the three-dimensional shape of an object, its distance, and its relative position and orientation.

4. A distributed sensor system as defined in claim 1 wherein said pattern of interspersed light emitters and receivers is comprised of thirteen receivers distributed on two concentric circles, six on an outer circle at points defining a hexagon, and six on an inner circle at points defining a smaller hexagon centered on the outer hexagon, but with its points rotated 30° from the points of the outer hexagon, and a thirteenth receiver at the center of the two concentric hexagons such that the centered receiver is spaced to form equilateral triangles with each two adjacent receivers on the inner hexagon, and each of the receivers on the outer hexagon forms an equilateral triangle with two adjacent receivers on the inner hexagon, and said light emitters are twelve in number dispersed with one in the center of each group of said three receivers that define an equilateral triangle.

5. A distributed sensor system as defined in claim 4 wherein each light emitter is comprised of a light emitting diode and an optical guide to form a light beam with its axis tilted slightly toward the center of an adjacent receiver that is either closer or further from the center of said concentric hexagons and with a dispersion angle sufficient to span one of said light receivers toward which it is tilted, whereby said twelve light emitters are dispersed on two circles, six on an outer circle, alternately tilted in and out with respect to the center of said concentric hexagons, and six on an inner circle alternately tilted in and out in a similar manner, and positioned on the same radial line as emitters on the outer circle, but tilted in the opposite direction from the emitters on the outer circle so that they alternately tilt toward and away from each other in six radial line positions spaced at 60° intervals.

6. A distributed sensor system as defined in claim 5 wherein each light receiver is comprised of a geometrically defined nonplanar surface embedded in said moving member, and an array of photosensitive devices uniformly spaced on said geometrically defined nonplanar surface whereby the position of a photosensitive device in the receiver which receives the most reflected light depends upon the incidence angle of the reflected light, which in turn depends upon the distance and orientation of an object reflecting light from one of said emitters.

7. A distributed sensor system as defined in claim 6 wherein each receiver has a defined shape of a hollow hemisphere having said photosensitive devices uniformly spaced on the inside surface of said hollow hemisphere.

8. A distributed sensor system as defined in claim 6 wherein each receiver has a defined shape of a hollow cylinder with a reflecting cone having its base at the end of said cylinder opposite the end receiving light and its axis coincident with the axis of said hollow cylinder, and having said photosensitive devices spaced in linear arrays on the inside surface of a hollow cylinder, each linear array being disposed parallel to the axis of said hollow cylinder.

* * * * *

UNITED STATES PATENT AND TRADEMARK OFFICE
CERTIFICATE OF CORRECTION

PATENT NO. : 4,893,025
DATED : Jan. 9, 1990
INVENTOR(S) : Sukhan Lee

It is certified that error appears in the above-identified patent and that said Letters Patent is hereby corrected as shown below:

On the title page, Item [73] should read:

Assignee: United States of America as represented by the Administrator, National Aeronautics and Space Administration, Washington, D. C.

Attorney, Agent or Firm - Thomas H. Jones, John R. Manning, Charles E. B. Glenn

Signed and Sealed this

Eighteenth Day of June, 1991

Attest:

HARRY F. MANBECK, JR.

*Attesting Officer*   Commissioner of Patents and Trademarks